Feb. 14, 1967 J. E. WEBB ETAL 3,303,729
NON-SKID TIRE CHAIN ATTACHMENT CLIP
Filed July 1, 1965
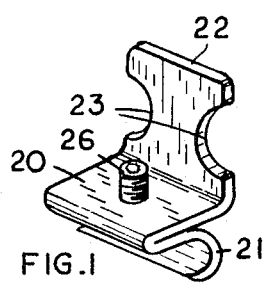
FIG.1
FIG.2
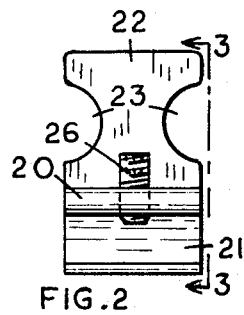
FIG.3
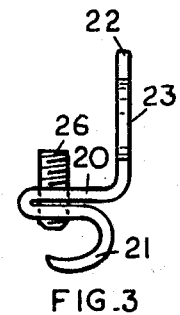
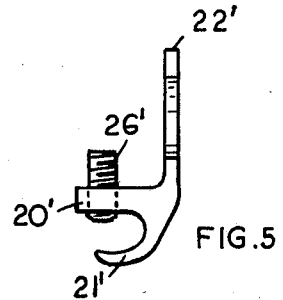
FIG.5
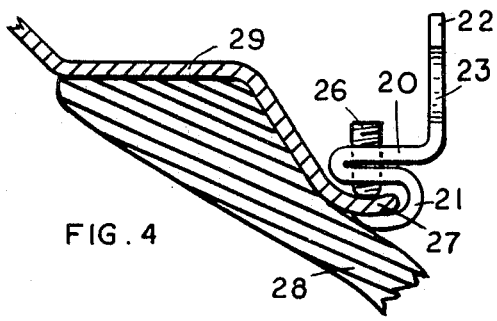
FIG.4
FIG.6
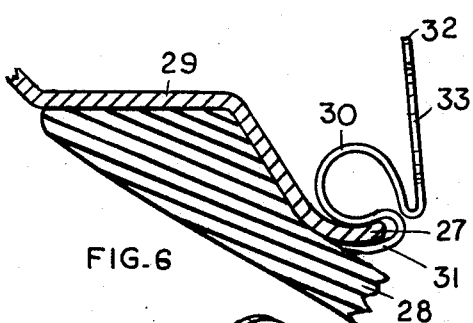
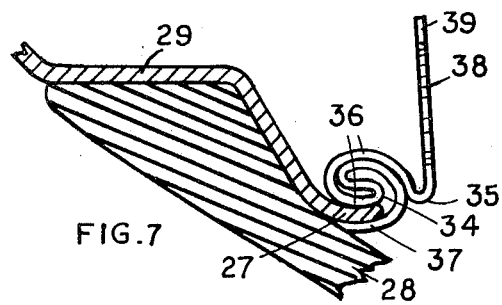
FIG.7
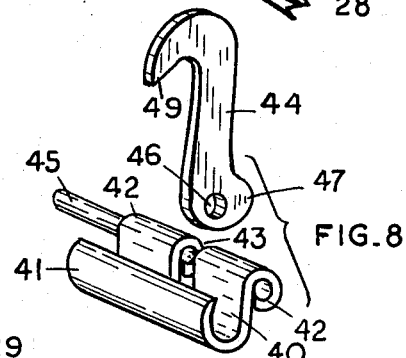
FIG.8
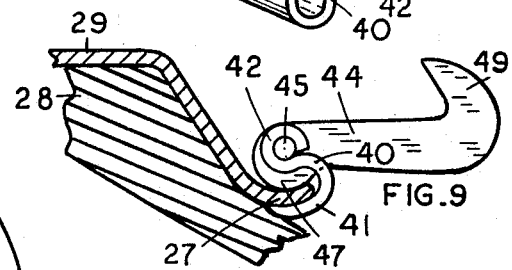
FIG.9
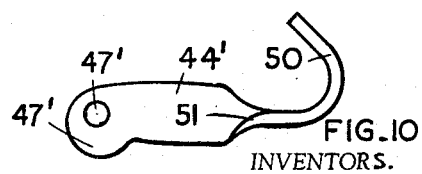
FIG.10
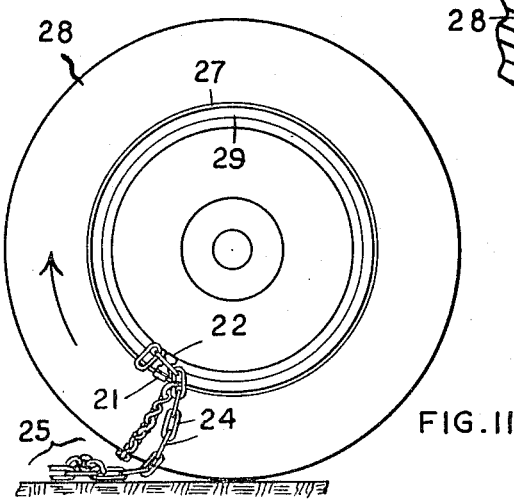
FIG.11
INVENTORS.
JOHN E. WEBB
BY ELMER M. SCOTT
*Fred C. Matheny*
ATTORNEY

United States Patent Office 3,303,729
Patented Feb. 14, 1967

3,303,729
NON-SKID TIRE CHAIN ATTACHMENT CLIP
John E. Webb, 4747 46th Ave. SW., Seattle, Wash.
98106, and Elmer M. Scott, 7061 7th Ave. NW., Seattle, Wash. 98107
Filed July 1, 1965, Ser. No. 468,795
3 Claims. (Cl. 81—15.8)

Our invention relates to a non-skid tire chain attachment clip for attachment to a wheel rim to facilitate the application of a non-skid tire chain to a tire carried by said rim.

An object of our invention is to provide a simple and inexpensive clip which can be quickly and easily secured to the outwardly directed flange of the rim on a vehicle wheel to facilitate attachment to the wheel rim of an end portion of a non-skid tire chain so that said tire chain can, without jacking up the wheel, be wound or draped around a tire on the wheel rim by moving the vehicle far enough to impart approximately one complete revolution to the wheel, thereby positioning the tire chain so that its two end portions can conveniently be attached together to complete its application to the tire.

Another object is to provide a one piece clip having an intermediate shelf like part and having a hook shaped rim flange engaging member rigid with an edge of said shelf like part and arching away from and back over said shelf like part in opposed spaced relation therefrom and having rim clamping means carried by said shelf like part and having a flat tire chain attachment plate rigid with the same edge of the shelf like part as said hook shaped flange and extending perpendicularly outward therefrom in an opposite direction from said hook shaped flange, said plate having similarly notched opposed edges shaping it to receive and be engaged by non-skid tire chain links when the clip is applied to either side of a wheel rim.

Other objects of our invention will be apparent from the following description taken in connection with the accompanying drawings.

In the drawings FIGURE 1 is a perspective view of a tire chain attachment clip constructed in accordance with our invention and in which a screw is used as a clamping means.

FIG. 2 is a view in elevation showing the outer side of said clip.

FIG. 3 is an edge view looking in the direction of broken line 3—3 of FIG. 2.

FIG. 4 is a view, partly in cross section, showing said clip applied to an outwardly directed flange of a wheel rim, a fragment only of the rim and a tire on said rim being shown.

FIG. 5 is an edge view of a tire chain attachment clip of modified form which uses a screw as its clamping means.

FIG. 6 is an edge view, with parts in section, showing a resilient self gripping type chain attachment clip as it may appear when applied to a wheel rim.

FIG. 7 is an edge view, with parts in cross section, showing another self gripping type resilient tire chain attachment clip as it may appear when in operative position on a wheel rim.

FIG. 8 is an exploded perspective view of another tire chain attachment clip of modified form and which uses a cam as a means for attaching it to a rim.

FIG. 9 is an edge view of the clip shown in FIG. 8 showing the clip assembled and applied to a wheel rim, the rim and a fragment of a tire thereon being shown in section.

FIG. 10 is a detached edge view of a combined hook and cam lever of modified form which may be used in place of the combined hook and cam lever shown in FIGS. 8 and 9.

FIG. 11 is a somewhat diagrammatic view in elevation illustrating one method of using this tire chain attachment clip in applying a tire chain to a tire on a wheel.

Like reference numerals refer to like parts throughout the several views.

The tire chain applying clip shown in FIGS. 1 to 4 comprises a shelf like frame part 20 having two other parts 21 and 22 rigid therewith and extending in approximately opposite directions therefrom. The part 21 is a rim engaging member of hook shaped cross section which arches over and away from the shelf like part 20 in opposed relation to said part 20. The part 22 is approximately flat and extends in the opposite direction from the part 21 and has in its edge portions notches 23 which shape is so that it serves as a double hook over which a link 24, FIG. 11, in a side chain of a non-skid tire chain 25 can be hooked. Providing a notch 23 in each edge of the part 22 makes this clip reversible for application to either the right or left side of a rim. Preferably all of the parts just hereinbefore described are of substantial width from side to side. This width may conveniently be about three fourths of an inch for clips intended for use on ordinary passenger automobiles.

The shelf like part 20 is provided with a suitable threaded perforation within which a set screw 26 operates. Preferably the set screw 26 is of the conventional type known as an "Allen" screw and has in its head a hexagonal recess to receive a part of an L-shaped driver member of conventional form and which can be more conveniently applied than a straight screw driver or ordinary wrench.

The clip shown in FIGS. 1 to 4 is formed by bending a flat piece of metal to the desired shape. FIG. 5 shows a similar clip of one piece construction which is formed by a process other than bending and is the same in purpose and function as the clip shown in FIGS. 1 to 4. Said clip shown in FIG. 5 is made up of three parts 20', 21' and 22' corresponding respectively to the parts 20, 21 and 22 of the clip of FIGS. 1 to 4. A clamp screw 26' is threaded through the shelf like part 20'.

The clip shown in FIGS. 1 to 4 is adapted to be securely clamped to the outwardly extending marginal flange 27, FIGS. 4 and 11, of a wheel rim 29 which carries a tire 28 by slipping said clip over the flange 27 and tightening the screw 26 against said flange 27. When two of said clips are thus secured to opposite flanges 27 of a wheel rim and the side chain links 24 near one end of a non-skid tire chain 25 are engaged with the parts 22 of said clips the non-skid tire chain can easily be wound around a tire 28 on the wheel by moving the vehicle of which the wheel is a part far enough to impart approximately one complete revolution to the wheel. Thus a tire chain can be applied to a tire without jacking up the wheel. The tip portion of the hook shaped member 21 is tapered to a thin edge to make it easier to insert this part between the tire 28 and rim flange 27 and to cause it to engage the rim flange 27 more securely.

The clip shown in FIG. 5 is applied to a rim in the same manner as the clip shown in FIGS. 1 to 4 and it functions in the same manner.

The tire chain attachment clip shown in FIG. 6 is formed of resilient sheet metal shaped and dimensioned so that it can be pressed onto a rim flange 27 and will frictionally bind tightly enough on said rim flange to make it satisfactory for use in applying a non-skid tire chain to a wheel. Said clip comprises an intermediate shelf part in the form of a loop 30 of generally cylindrical cross sectional shape having two oppositely extending terminal parts 31 and 32. The part 31 is a resilient rim engaging member of hook shaped cross section which arches over and away from the adjacent part of the loop 30 in opposed spaced relation therefrom and is shaped to fit the curvature of the rim flange 27. The part 32 is approximately flat and extends in the opposite direction from the part 31 and has notches 33 in its edges to adapt it to function in the same manner as the previously described part 22 in forming a hook member with which links 24 of the side chains of a non-skid tire chain 25 can be engaged.

The tire chain attachment clip shown in FIG. 7 is formed of resilient sheet metal bent in a different way from the clip shown in FIG. 6 but shaped and dimensioned so it can be pressed onto a rim flange 27 and will frictionally bind fairly tightly thereon. In forming the clip of FIG. 7 a strip of resilient sheet metal is twice bent substantially double at the locations indicated by 34 and 35 to form three side by side parts. Two of these side by side parts are then bent cylindrically to form a rolled intermediate shelf part 36. The shelf part 36 has a terminal portion 37 which curves away from and over the shelf part and is adapted to fit over a rim flange 27. The third part 39 of said strip of resilient sheet metal can be varied in shape but it is herein shown as being plane and flat and as extending in a generally opposite direction from the part 37 and as having notches 38 in its edges to give it hook like characteristics whereby it can be engaged by links of the side chains of a tire chain.

The resilient clips shown in FIGS. 6 and 7 are easily applied to and removed from a rim flange, and when they are on a rim flange they are used in the same manner as the clip shown in FIGS. 1 to 4 in applying a tire chain to a tire.

The cam type tire chain applying clip shown in FIGS. 8 and 9 comprises a rim engaging member formed of a shelf like part 40 and a terminal part 41 of hook shaped cross section which curves away from and over the shelf like part 40 and is adapted to fit over a rim flange 27. The edge of the shelf part 40 opposite to the member 41 terminates in a reversely bent tubular bearing loop part 42. The bearing loop part 42 and shelf part 40 have a transverse slot 43 midway of their length and one end portion of a combined cam lever and hook member 44 is normally positioned in said slot 43 and pivotally connected with the bearing loop part 42 by a pivot pin 45. The pivoted end portion of the lever 44 has an off-center bearing perforation 46. A cam 47, off-center as respects the perforation 46 is provided on said lever 44. The outer end of said lever 44 is shaped to form a hook 49.

A cam lever 44' of modified form, shown in FIG. 10, can be used in connection with the clip formed by parts 40, 41 and 42 in place of the cam lever 44. Said cam lever 44' is similar to the cam lever 44 in that its inner end portion has a bearing pin receiving perforation 46' and a cam 47' similar respectively to the bearing perforation 46 and cam 47 of the lever 44. A hook 50 on the outer end portion of the cam lever 44' is formed by making a twisting bend 51 of about ninety degrees in the flat metal lever 44' and transversely bending the part outwardly from said twisting bend 51 to form said hook 50.

In the use of the cam type clip shown in FIGS. 8, 9 and 10 two of said clips, with their levers 44 positioned so that the cams are retracted, are applied to the flanges 27 of a rim 29 at opposite locations and said levers 44 are then moved into positions approximately as shown in FIG. 9 to tighten the cams 47 and clip parts 41 on the rim. Two side chain links 24 near the ends of the respective side chains of a non-skid tire chain are then engaged with the hooks 49 of the two levers, with the first cross chain of that end portion of the tire chain drawn across the tire so that the cams 47 of both clips are held tight against the rim flanges. The vehicle to which the tire chain is being applied is then moved far enough to impart about one complete revolution to the wheel and wind or drape the tire chain around the tire, leaving it in a suitable position for securing the two end portions of said tire chain together.

The foregoing description and accompanying drawings clearly disclose preferred embodiments of our invention but it will be understood that this disclosure is merely illustrative and that changes may be made within the scope of the following claims.

We claim:

1. A clip to facilitate attachment of a link of a non-skid tire chain to an outwardly extending flange of a wheel rim, comprising an intermediate shelf like part; a rim flange engaging member of hook shaped cross section rigid with an edge portion of said shelf like part and arching away from and over said shelf like part in opposed spaced relation therefrom; clamping means carried by said shelf like part adapted, when said clip is fitted over a rim flange, to be tightened against said rim flange and secure said clip to said rim flange; and a flat tire chain attachment plate rigid with an edge of said flat shelf like part outwardly from said clamping means and extending perpendicularly from said flat shelf like part in an opposite direction from said member of hook shaped cross section, said tire chain attachment plate having a notch in each of its two opposite edges shaping it to receive and be engaged by links of the side chains of a non-skid tire chain when the clip is applied to either side of a wheel rim.

2. A tire chain attachment clip comprising a flat metal plate bent double to form a shelf like part; a rim flange engaging member of hook like cross section rigid with one end portion of said shelf like part and arched away from and over said shelf like part in opposed spaced relation therefrom, the inner face of said rim flange engaging member being adapted to engage with one side of a rim flange when the clip is fitted over the rim flange; a tire chain connector member rigid with the other end portion of said shelf like part and extending outwardly therefrom in a generally opposite direction from said rim flange engaging member and being approximately flat and having two notches in its respective edges, whereby said tire chain connector member is reversible and applicable to either side of a wheel rim, said notches being shaped to receive and be engaged by links of the side chains of a non-skid tire chain; and a clamping screw threaded through said shelf like part and positioned to be tightened against the rim flange to clamp the clip to the rim flange.

3. A clip to facilitate attachment of the side chains of a non-skid tire chain to an outwardly extending flange of a wheel rim comprising an intermediate shelf like part; a rim flange engaging member of hook shaped cross section rigid with an edge portion of said shelf like part and arching away from and over said shelf like part in opposed spaced relation therefrom; a lever member pivotally connected with said shelf like part; a cam rigid with the pivoted end portion of said lever member and located between said shelf and said flange engaging member and adapted, when said clip is fitted over a rim flange, to be tightened against said rim flange and secure said clip to said rim flange, the outer end portion of said lever having means to receive a link of a side chain of a non-skid tire chain.

References Cited by the Examiner

UNITED STATES PATENTS

| 2,171,592 | 9/1939 | Nagle | 152—233 |
| 2,204,886 | 6/1940 | Devlin | 152—233 |
| 2,609,027 | 9/1952 | Locke | 152—213 |
| 2,731,059 | 1/1956 | Ford | 152—213 |
| 2,840,132 | 6/1958 | Palmer et al. | 152—255 |
| 3,212,149 | 10/1965 | Yohe | 24—84 |

WILLIAM FELDMAN, *Primary Examiner.*

OTHELL M. SIMPSON, *Examiner.*